Dec. 15, 1925.  1,566,132

L. E. UNDERWOOD

INSULATING STUD

Filed July 11, 1924

Inventor:
Louis E. Underwood,
by
His Attorney.

Patented Dec. 15, 1925.

1,566,132

UNITED STATES PATENT OFFICE.

LOUIS E. UNDERWOOD, OF SWAMPSCOTT, MASSACHUSETTS, ASSIGNOR TO GENERAL ELECTRIC COMPANY, A CORPORATION OF NEW YORK.

INSULATING STUD.

Application filed July 11, 1924. Serial No. 725,495.

*To all whom it may concern:*

Be it known that I, LOUIS E. UNDERWOOD, a citizen of the United States, residing at Swampscott, in the county of Essex, State of Massachusetts, have invented certain new and useful Improvements in Insulating Studs, of which the following is a specification.

My invention relates to insulating studs and is particularly applicable to such studs as are used to support brush-holders of dynamo-electric machines.

The object of my invention is to produce such a stud which will be simple, cheap and strong in construction and one which will possess superior insulating properties.

Figure 1:
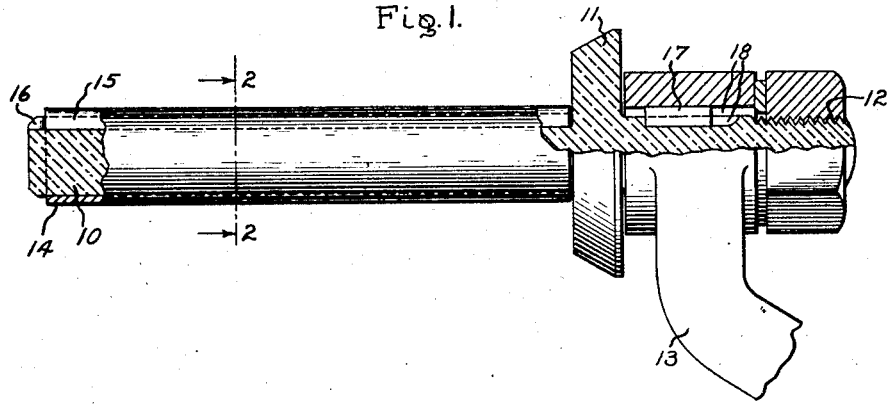
Figure 2:
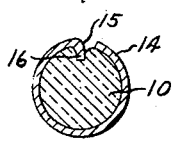

The various features of novelty which characterize my invention are pointed out in the claims annexed to and forming a part of this specification. For a better understanding of my invention and the advantages possessed by it, reference may be had to the following description taken in connection with the accompanying drawings in which Fig. 1 is a view partly in section of a stud embodying my invention; Fig. 2 is a sectional view of the stud shown in Fig. 1 taken along line 2—2, and Fig. 3 is a modification of the stud shown in Fig. 1.

In Fig. 1 of the drawing, 10 indicates a stud of insulating material such as bakelite, or the like. The stud 10 has a collar 11 thereon which is located intermediate its ends. One end of the stud 10 is threaded as at 12 or is provided with other securing means for holding it to any suitable support. In the drawing this support is shown as an arm 13 of a brush-holder yoke. The other end of the stud 10 is provided with a current carrier or sleeve 14 which surrounds its projecting end and is adapted to carry brush-holders, not shown.

The collar 11 forms a barrier or leakage collar between the support 13 and the brush-holders and thus minimizes the danger of flashovers from the brushes to the support 13. The sleeve 14 is provided with a turned down edge 15 which cooperates with a groove 16 in the stud 10, as shown in Fig. 2, to prevent it turning thereon. The sleeve 14 also serves to stiffen the stud 10. When the brush-holders are clamped upon the stud 10, the sleeve 14 serves to protect the stud 10 against damage due to pressure and also to connect the adjacent brush-holders together electrically. When a plurality of studs 10 are used on a dynamo electric machine and connections between the respective studs 10 are necessary, a terminal (not shown) is also clamped to the sleeve 14 and connections are then made between these terminals. In order to prevent the stud 10 turning in the support 13, I provide a key 17 which engages keyways 18 in the stud 10 and support 13.

Figure 3:
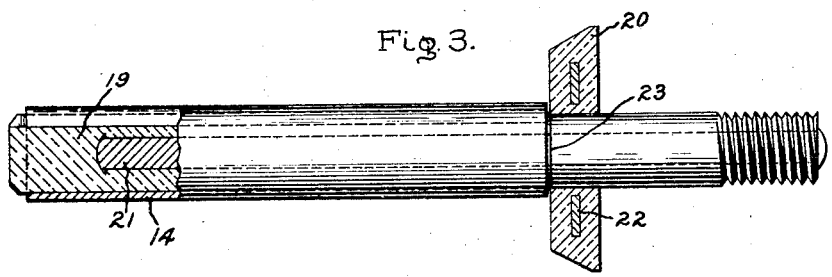

In the modification shown in Fig. 3 of the drawing, a stud 19 is shown having a collar 20 intermediate its ends and having re-enforcing members 21 and 22 imbedded in the stud 19 and collar 20 respectively. The collar 20 can be formed integral with the stud 19 or made as a separate part as shown in the drawing. If the collar 20 is made as a separate part, a shoulder 23 is provided upon the stud 19 for holding it in place. The re-enforcing member 21 provides additional stiffness in the stud 10 and when provided with enlarged ends as shown, which interlock with the mouldable material forming the stud 10, gives the finished stud greater tensile strength than would be the case if no enlargement or other like means such as a roughened surface were provided. This latter feature insures against the stud being ruptured easily by the securing means.

While the insulating studs 10 and 19 could be machined in a manner similar to the machining of any metal, I propose to mould them complete in one operation and then slip the sleeve 14 over the projecting end.

From the above, it will be seen that I have produced a stud having good insulating qualities and one which is light, strong and simple to manufacture.

What I claim as new and desire to secure by Letters Patent of the United States, is:

1. In a support for brush-holders, the combination of an insulating stud having a leakage collar formed integrally therewith intermediate its ends, means on one side of said collar for securing said stud to a support, a metallic sleeve surrounding said stud on the other side of said collar for carrying brush-holders, and means on said sleeve cooperating with said stud for preventing said sleeve turning thereon.

2. In a support for brush-holders, the combination of an insulating stud having a leakage collar thereon intermediate its ends, means on one side of said collar for securing said stud to a support, a metallic sleeve surrounding said stud on the other side of said collar for carrying brush-holders, and reenforcing means moulded within said stud and said leakage collar.

3. In a stud for brush-holders, the combination of an insulating stud having a leakage collar thereon intermediate its end, means on one side of said collar for securing said stud to a support, a metallic sleeve surrounding said stud on the other side of said collar for carrying brush-holders, a re-enforcing member moulded within said stud, and means upon said re-enforcing member interlocking with said insulating stud.

In witness whereof, I have hereunto set my hand this third day of July, 1924.

LOUIS E. UNDERWOOD.